(12) United States Patent
Ahn et al.

(10) Patent No.: US 11,549,009 B2
(45) Date of Patent: *Jan. 10, 2023

(54) COMPOSITION FOR 3 DIMENSIONAL PRINTING

(71) Applicant: LG Chem, Ltd., Seoul (KR)

(72) Inventors: Sang Bum Ahn, Daejeon (KR); Jin Kyu Lee, Daejeon (KR); Hyeok Jeong, Daejeon (KR)

(73) Assignee: LG Chem, Ltd.

( * ) Notice: Subject to any disclaimer, the term of this patent is extended or adjusted under 35 U.S.C. 154(b) by 532 days.

This patent is subject to a terminal disclaimer.

(21) Appl. No.: 16/074,689

(22) PCT Filed: Dec. 27, 2016

(86) PCT No.: PCT/KR2016/015319
§ 371 (c)(1),
(2) Date: Aug. 1, 2018

(87) PCT Pub. No.: WO2017/135576
PCT Pub. Date: Aug. 10, 2017

(65) Prior Publication Data
US 2019/0040248 A1 Feb. 7, 2019

(30) Foreign Application Priority Data

Feb. 5, 2016 (KR) .................. 10-2016-0015131

(51) Int. Cl.
*H01F 1/37* (2006.01)
*H01F 1/03* (2006.01)
(Continued)

(52) U.S. Cl.
CPC ............ *C08L 33/12* (2013.01); *B29C 64/364* (2017.08); *B29C 64/393* (2017.08); *B29C 67/00* (2013.01);
(Continued)

(58) Field of Classification Search
CPC ..... H01F 1/28; H01F 1/37; H01F 1/03; H01F 1/047; H01F 1/147; H01F 1/20;
(Continued)

(56) References Cited

U.S. PATENT DOCUMENTS 10,892,075 B2 * 1/2021 Lee .................. H01F 41/02
11,232,891 B2 * 1/2022 Park .................. C08K 3/20
(Continued)

FOREIGN PATENT DOCUMENTS

CN 102408680 A 4/2012
CN 103213281 A 7/2013
(Continued)

OTHER PUBLICATIONS

Ozdemir, "Coercive force of single crystals of magnetite at low temperatures", 2000, Geophys.J.Int.. vol. 141, pp. 351-356. (Year: 2000).*

(Continued)

*Primary Examiner* — Matthew E. Hoban
*Assistant Examiner* — Lynne Edmondson
(74) *Attorney, Agent, or Firm* — Lerner, David, Littenberg, Krumholz & Mentlik, LLP

(57) ABSTRACT

The present invention relates to a composition for 3D printing, a 3D printing method using the same, and a three-dimensional comprising the same, and provides a composition for 3D printing capable of realizing a three-dimensional shape having precision and excellent curing stability.

15 Claims, 1 Drawing Sheet

(51) Int. Cl.
*C08K 3/22* (2006.01)
*C08L 101/12* (2006.01)
*B29C 64/165* (2017.01)
*B33Y 70/10* (2020.01)
*C08L 33/12* (2006.01)
*B33Y 50/02* (2015.01)
*B29C 67/00* (2017.01)
*B29C 64/364* (2017.01)
*B29C 64/393* (2017.01)
*C08K 3/08* (2006.01)
*C08L 25/06* (2006.01)
*C08L 27/12* (2006.01)
*C08L 83/04* (2006.01)
*B33Y 70/00* (2020.01)

(52) U.S. Cl.
CPC .............. *B33Y 50/02* (2014.12); *C08K 3/08* (2013.01); *C08K 3/22* (2013.01); *C08L 25/06* (2013.01); *C08L 27/12* (2013.01); *C08L 83/04* (2013.01); *B33Y 70/00* (2014.12); *C08K 2003/0856* (2013.01); *C08K 2003/2265* (2013.01); *C08K 2003/2275* (2013.01); *C08K 2201/005* (2013.01); *C08K 2201/01* (2013.01)

(58) Field of Classification Search
CPC . C08K 3/22; C08K 3/08; C08K 3/013; C08K 5/00; C08K 2201/01; C08K 2201/005; C08K 2201/011; C08K 2003/2265; C08K 2003/2272; C08K 2003/0856; C08K 2003/2268; C08K 2003/2275; C08L 33/12; C08L 33/08; C08L 63/00; C08L 25/06; C08L 27/12; C08L 83/04; C08L 101/02; C08L 55/02; B29C 64/393; B29C 64/165; B29C 64/364; B29C 67/00; B22F 2202/05; B22F 3/008; B22F 1/0059; B29K 2101/10; B29K 2995/0008; B33Y 70/00; B33Y 70/10; B33Y 10/00; C01P 2004/64; C01P 2006/42; C09D 5/02; C22C 2202/02; C08J 2300/24
See application file for complete search history.

(56) References Cited

U.S. PATENT DOCUMENTS

| | | | |
|---|---|---|---|
| 2004/0072025 A1* | 4/2004 | Kishimoto | G11B 5/714 |
| 2009/0039309 A1 | 2/2009 | Bose et al. | |
| 2009/0230347 A1 | 9/2009 | Pridohl et al. | |
| 2010/0272966 A1 | 10/2010 | Gould | |
| 2015/0255196 A1 | 9/2015 | Weller et al. | |
| 2015/0344682 A1 | 12/2015 | Ganapathiappan et al. | |
| 2016/0200011 A1* | 7/2016 | Rothfuss | B32B 27/18 |
| | | | 264/494 |
| 2016/0346997 A1* | 12/2016 | Lewis | B33Y 70/00 |

FOREIGN PATENT DOCUMENTS

| | | | |
|---|---|---|---|
| CN | 103854844 A | 6/2014 | |
| CN | 104801704 A | 7/2015 | |
| EP | 3354376 A1 | 8/2018 | |
| EP | 3354684 A1 | 8/2018 | |
| JP | H07509188 A | 10/1995 | |
| JP | 200094530 A | 4/2000 | |
| JP | 2008107567 A | 5/2008 | |
| JP | 2008521747 A | 6/2008 | |
| JP | 2010150441 A | 7/2010 | |
| KR | 20150077611 A | 7/2015 | |
| WO | 9320993 A1 | 10/1993 | |
| WO | 2015120429 A1 | 8/2015 | |

OTHER PUBLICATIONS

Goya et al., "Magnetic Hyperthermia with Fe3O4 nanoparticles: the Influence of Particle Size on Energy Absorption", IEEE Transaction on Magnetics, vol. 44, No. 11, 7 pages. (Year: 2008).*
Chinese Search Report for Application No. CN 201680081145.6 dated Dec. 25, 2019, 4 pages.
Extended European Seach Report including Written Opinion for Application No. EP16889553.0 dated Dec. 17, 2018.
Search report from International Application No. PCT/KR2016/015319, dated Mar. 31, 2017.

* cited by examiner

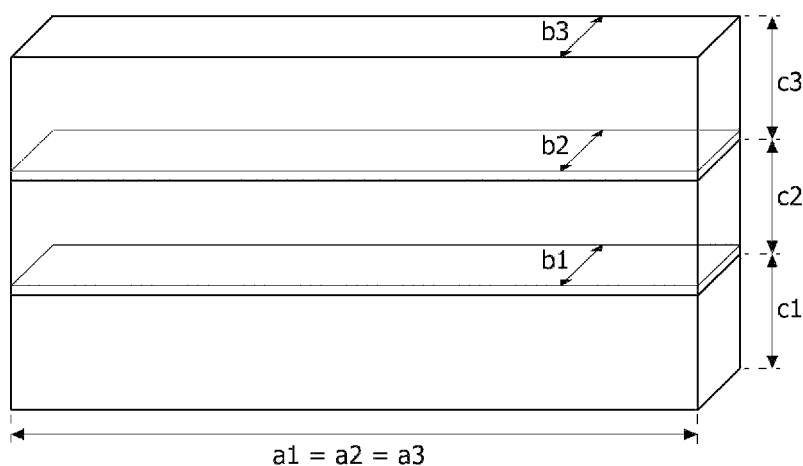

COMPOSITION FOR 3 DIMENSIONAL PRINTING

CROSS-REFERENCE TO RELATED APPLICATIONS

This application is a national phase entry under 35 U.S.C. § 371 of International Application No. PCT/KR2016/015319, filed Dec. 27, 2016, which claims priority to Korean Patent Application No. 10-2016-0015131, filed Feb. 5, 2016, the disclosures of which are incorporated herein by reference.

TECHNICAL FIELD

The present application relates to a composition for 3D printing, a method of 3D printing using the same, and a three-dimensional shape comprising the same.

BACKGROUND ART

The three-dimensional printer has a three-dimensional printing mechanism configured to three-dimensionally form a physical object. Researches related to a resin composition for 3D printing as a three-dimensional printing ink for three-dimensionally forming a physical object by such a three-dimensional printer, have been continuing.

In implementing the desired patterns or three-dimensional shapes, conventional 3D printing methods have been carried out by a method of curing a resin composition by heat, light, or the like. However, among these methods, the case of the thermosetting type is a relatively simple manufacturing process in which polymer filaments are thermally melted, extruded and dropped in drops at the designated point to complete a shape of laminating layer by layer, but there are problems such as an imprecise shape and non-uniform curing due to an equipment supplying heat, phase separation between organic/inorganic composite materials and heat shrinkage due to heating/cooling. In addition, the case of the photocurable type can express precisely, but there are problems such as size of equipment, storage and low hardness after curing.

DISCLOSURE

Technical Problem

The present application relates to a composition used as an ink of a 3D printer, and provides a composition for 3D printing capable of realizing a three-dimensional solid shape having precision and excellent curing stability.

Technical Solution

The present application relates to a composition for 3D printing. The composition for 3D printing can be applied, for example, to printing three-dimensional physical objects. In addition, the composition can be applied to sealing electronic devices. For example, the cured product of the composition can be applied to encapsulating a microelectronic device, for example, a micro-battery.

An exemplary composition for 3D printing may comprise a thermosetting compound, a thermoplastic resin, and magnetic particles. The thermoplastic resin may be included in the composition in a range of 1 to 40 parts by weight, 1 to 34 parts by weight, 2 to 28 parts by weight, 2 to 17 parts by weight, 3 to 13 parts by weight or 4 to 9 parts by weight, relative to 100 parts by weight of the thermosetting compound. The present application allows the resin composition to precisely implement a desired shape in forming the 3D solid shape by controlling the specific composition and the content range. Specifically, when forming the 3D solid shape, the ink composition is printed in a 3D printer through a nozzle, where if flowability of the ink is low, formation of a desired form is impossible, and if it is too high, the application through the nozzle is difficult. Therefore, the resin composition should have adherence to the laminated surface, hardening uniformity after curing, and shape stability in 3D printing, while having a suitable flowability. The present application provides a 3D printing composition having excellent hardening uniformity after curing while maintaining a solid shape with suitable flowability and adhesion in the printing operation.

In one example, the 3D printing composition may have a surface energy before curing in a range of 20 mN/m to 50 mN/m, 22 mN/m to 48 mN/m, 22 mN/m to 43 mN/m, or 23 mN/m to 38 mN/m. By controlling the surface energy of the composition, the present application can control the flowability upon application of the composition and maintain the adhesion to the laminated surface of the solid shape to realize shape stability of the solid shape. The surface energy of the composition before curing can be measured using a Tensiometer K10ST from Kruss. Specifically, the surface energy can be measured using Wilhelmy plate method. Typically, when a perpendicular plate made of platinum with a known perimeter was attached to a balance and the perpendicular plate came down to a film forming composition, the force due to wetting was measured using a digital tensiometer. That is, the surface energy is measured by the force due to wetting formed between two interfaces that a container for holding the ink composition is in the bottom and the loop-type platinum perpendicular plate is slowly lowered horizontally from the top.

Also, in an embodiment of the present application, the 3D printing composition may have a surface energy after curing in a range of 20 mN/m to 55 mN/m, 23 mN/m to 52 mN/m, 26 mN/m to 48 mN/m, or 28 mN/m to 43 mN/m. The present application can realize a three-dimensional shape having excellent surface physical properties by controlling the surface energy of the composition after curing. Here, the surface energy ($\gamma^{surface}$, mN/m) can be calculated as $\gamma^{surface} = \gamma^{dispersion} + \gamma^{polar}$. In one example, the surface energy can be measured using a drop shape analyzer (DSA100 product from KRUSS). For example, after applying a 3D printing composition, which is intended to measure the surface energy, to a SiNx substrate with a thickness of about 50 μm and a coating area of 4 $cm^2$ (width: 2 cm, length: 2 cm) to form a three-dimensional shape (spin coater), a magnetic field is applied to thermally cure the composition. After curing, a procedure, in which deionized water having a known surface tension is dropped on the film to obtain the contact angle, is repeated 5 times to calculate an average value of the obtained five contact angle values, and equally, a procedure, in which diiodomethane having a known surface tension is dropped to obtain the contact angle, is repeated 5 times to calculate an average value of the obtained five contact angle values. Then, the surface energy can be calculated by substituting values (Strom values) related to surface tension of solvents by the Owens-Wendt-Rabel-Kaelble method using the calculated average values of contact angles for deionized water and diiodomethane.

By controlling the surface energy before or after curing of the composition, the present application can control flowability upon application of the composition and maintain adhesion to the laminated surface of the three-dimensional shape to realize shape stability of the three-dimensional shape. In comprising the aforementioned thermosetting compound and thermoplastic resin, the present application can select the kind of the compound or resin so as to satisfy the surface energy range before or after curing.

In an embodiment of the present application, the magnetic particles may have two or more magnetic domains (multi-magnetic domains). In addition, the magnetic particles may have irregularly arranged magnetic domains when an external magnetic field is absent, and be magnetized by an external alternate-current magnetic field. Here, the irregular arrangement of the magnetic domains may mean a state where magnetic directions existing in the magnetic domains are each different and not aligned, and in this case, may be a state without magnetism as the net value of the magnetization at room temperature is zero. However, when an external magnetic field is applied, the magnetic directions of the magnetic domains are aligned, whereby the magnetic particles can be magnetized. The magnetic particles may be super-paramagnetic particles, but are not limited thereto. In the 3D printing method according to the present application, the composition is sterically applied to form a three-dimensional shape and vibrational heat is generated from the magnetic particles through the application of a magnetic field, whereby the entire thermosetting compound can be uniformly cured.

Among the existing 3D printing methods, there is also a method of curing or sintering a resin using a technique to generate heat by adding a metal or a conductive material (carbon or carbon nanotube) and electromagnetically inducing or irradiating it with microwaves, but in the case of electromagnetic induction, the temperature difference between the contact surface and the inside may be generated to cause a problem in the physical properties of the resin after curing, and in the case of microwaves, there is a risk of exposure to the human body during the replacement operation in the process.

The present application generates vibrational heat by magnetization reversal of magnetic particles through electromagnetic induction heating, whereby the generated heat can cure the thermosetting compound. In the case of the conventional technique to generate heat by electromagnetic induction, heat is generated by eddy current, where heat was generated by hysteresis loss of a metal or a magnetic material. However, in the case of the present application, as the particles of the magnetic material become smaller to be nano-sized, the hysteresis loss of the magnetic material itself becomes smaller and only the saturation magnetization value exists. Therefore, the present application can generate heat due to vibrations between magnetic materials, other than eddy currents. That is, in the present application, the magnetic material itself vibrates due to the coercive force of the magnetic particles under an external magnetic field, where the thermosetting compound can be cured using the generated heat, and the curing proceeds from the inside of the composition, so that the cured product can have excellent physical properties. Accordingly, the present application can realize uniform and stable curing.

As described above, the magnetic particles may comprise two or more magnetic domains. In the present specification, the term "magnetic domain" generally means a region in which magnetization directions are differently divided within a magnetic material. In the present application, magnetic particles having two or more magnetic domains are strongly magnetized by an external alternate-current magnetic field to generate vibrational heat, and when the magnetic field is eliminated, the magnetic particles return to the original magnetic domains, whereby magnetic particles with low residual magnetization of hysteresis loss can be provided.

In one example, the magnetic particles may have a coercive force in a range of 1 to 200 kOe, 10 to 150 kOe, 20 to 120 kOe, 30 to 100 kOe, 40 to 95 kOe, or 50 to 95 kOe. The term "coercive force" herein may mean an intensity of the critical magnetic field required to reduce the magnetization of the magnetic material to zero. More specifically, a magnetic material magnetized by an external magnetic field maintains a certain degree of magnetized state even if a magnetic field is removed, where the intensity of a magnetic field capable of making the magnetization degree to zero by applying a reverse magnetic field to the magnetic material thus magnetized is referred to as a coercive force. The coercive force of the magnetic material may be a criterion for distinguishing a soft magnetic material or a hard magnetic material, and the magnetic particles of the present application may be a soft magnetic material. By controlling the coercive force of the magnetic particles in the above range, the present application more easily realizes the magnetization reversal of the magnetic material to generate vibrational heat to a desired degree in the present application, so that it can satisfy a desired degree of curing physical properties by uniform curing of the resin.

In one example, for a physical property value measured in the present application, when the measured value is a value varying with temperature, the measured temperature may be room temperature, for example, 25° C.

Furthermore, in one example, the magnetic particle has a saturation magnetization value at 25° C. in a range of 20 to 150 emu/g, 30 to 130 emu/g, 40 to 100 emu/g, 50 to 90 emu/g, or 60 to 85 emu/g. By being capable of controlling the magnetic particles to have a relatively large saturation magnetization value and thus generating heat by vibration between magnetic particles other than eddy currents, the present application can satisfy curing physical properties by uniform curing of the resin. In the present application, the measurement of physical properties of the magnetic particles can be calculated by the value of VSM (Vibrating Sample Magnetometer). The VSM is a device that measures magnetization values of samples by recording the applied magnetic field applied by a Hall probe and recording the electromotive force obtained on applying vibration to the sample by Faraday's law. According to Faraday's law, it can be seen that if the N pole of a bar magnet is directed and pushed towards the coil, the galvanometer moves and the current flows through the coil. The resultant current is called induction current, which was made by induced electromotive force. The VSM is a method of detecting the induced electromotive force, which occurs on vibrating a sample by such a basic operation principle, in the search coil, to measure the magnetization value of the sample by this electromotive force. The magnetic characteristics of a material can be measured simply as functions of magnetic field, temperature and time, and quick measurement in a magnetic force of up to 2 Tesla and a temperature range of 2 K to 1273 K is possible.

In an embodiment of the present application, the magnetic particles may have an average particle size in a range of 20 nm to 300 nm, 30 nm to 250 nm, 40 nm to 230 nm, or 45 nm to 220 nm. In addition, the magnetic domains in the magnetic particles may have an average size in a range of 10 to 50 nm or 20 to 30 nm. The present application can generate heat capable of uniformly curing the resin in the composition by controlling the number of magnetic domains and the magnitude of the coercive force of the magnetic particles to an appropriate range in the particle size range. The present application can generate sufficient vibrational heat on curing through a low coercive force and a large number of magnetic domains by controlling the size of the particles to 20 nm or more, and allow only the saturation magnetization value to be present while reducing hysteresis loss of the magnetic material itself, thereby realizing uniform and stable curing by controlling the particle size to 300 nm or less.

If the magnetic particles of the present application can generate heat through electromagnetic induction heating, the material is not particularly limited. For example, the magnetic particles may comprise metal oxide, ferrite, or alloy particles.

In addition, in an embodiment of the present application, the magnetic particles may satisfy Formula 1 below.

$$MX_aO_b \quad \text{[Formula 1]}$$

In Formula 1 above, M is a metal or a metal oxide, X includes Fe, Mn, Co, Ni or Zn, and $|a \times c| = |b \times d|$ is satisfied, where c is the cation charge of X, and d is the anion charge of oxygen. In one example, M may be Fe, Mn, Mg, Ca, Zn, Cu, Co, Sr, Si, Ni, Ba, Cs, K, Ra, Rb, Be, Li, Y, B, or an oxide thereof. For example, when $X_aO_b$ is $Fe_2O_3$, c may be +3 and d may be −2. Also, for example, when $X_aO_b$ is $Fe_3O_4$, it can be expressed as $FeOFe_2O_3$, so that c may be +2 and +3, respectively, and d may be −2. The magnetic particles of the present application are not particularly limited as long as they satisfy Formula 1 above, and may be, for example, $MFe_2O_3$.

In one example, the 3D printing composition of the present application may comprise, as magnetic particles, a compound of Formula 1 above alone, or a mixture of compounds of Formula 1 or a compound doping a compound of Formula 1 with an inorganic substance. The inorganic substance may comprise a monovalent to trivalent cationic metal or an oxide thereof, and two or more of plural cationic metals may be used.

In one example, the magnetic particles may comprise those having surface-treated particle surfaces. That is, the composition of the present application may comprise particles surface-treated with a metal, a metal oxide, an organic substance or an inorganic substance on the surface of the magnetic particles. The present application can prevent the magnetic particles from losing the coercive force of the magnetic material by oxidation in air through the surface treatment. Furthermore, the surface treatment can improve compatibility with the filler, the dispersant organic solvent and the like to be described below, and improve dispersibility of the composition. In one example, the surface treatment can form a polymer of polymethyl methacrylate (PMMA) on the surface by attaching a methyl methacrylate (MMA) monomer to a magnetic particle having a carboxyl group on its surface. In addition, the surface treatment can be carried out by being subjected to an acid treatment to remove the oxide film on the surface, and the surface treatment can be also carried out through a method of coating silica particles.

In an embodiment of the present application, the magnetic particles may form magnetic clusters. By forming the nanoclusters, the nanoparticle-sized magnetic material can prevent agglomeration between the magnetic materials and improve dispersibility, thereby effectively curing the resin by vibrational heat.

In an embodiment of the present application, the magnetic particles may be included in an amount of 0.01 to 25 parts by weight, 0.1 to 20 parts by weight, 1 to 15 parts by weight, 3 to 13 parts by weight, or 5 to 12 parts by weight, relative to 100 parts by weight of the thermosetting compound. In the present specification, unless otherwise specified, the unit "part by weight" means a weight ratio between the respective components. By controlling the content of the magnetic particles in the above weight ratio, the present application can cure the composition through sufficient heat upon 3D printing, and allow the composition to be uniformly cured without phase separation of the composition.

In one example, the 3D printing composition of the present application may comprise a thermosetting compound. The thermosetting compound may comprise a curable resin. The term "thermosetting compound" may mean a resin that can be cured through application of an appropriate heat or an aging process.

The specific kind of the thermosetting compound in the present application is not particularly limited as long as it has the above-mentioned characteristics. In one example, the thermosetting compound may comprise at least one thermosetting functional group. For example, it may comprise one or more of thermosetting functional groups such as an epoxy group, a glycidyl group, an isocyanate group, a hydroxy group, a carboxyl group or an amide group, which can be cured to exhibit the adhesive property. In addition, a specific kind of the thermosetting compound as above may include an acrylic resin, a polyester resin, an isocyanate resin, an ester resin, an imide resin or an epoxy resin, but is not limited thereto.

As the thermosetting compound in the present application, aromatic or aliphatic; or linear or branched epoxy resins may be used. In one embodiment of the present application, an epoxy resin having an epoxy equivalent of 180 g/eq to 1,000 g/eq, which contains two or more functional groups, may be used. By using an epoxy resin having an epoxy equivalent in the above range, properties such as adhesion performance and glass transition temperature of the cured product can be effectively maintained. An example of such an epoxy resin may include one or a mixture of two or more of a cresol novolac epoxy resin, a bisphenol A epoxy resin, a bisphenol A novolak epoxy resin, a phenol novolak epoxy resin, a tetrafunctional epoxy resin, a biphenyl type epoxy resin, a triphenol methane type epoxy resin, an alkyl-modified triphenol methane epoxy resin, a naphthalene-type epoxy resin, a dicyclopentadiene type epoxy resin, or a dicyclopentadiene-modified phenol type epoxy resin.

In the present application, preferably, an epoxy resin containing a cyclic structure in the molecular structure may be used, and more preferably, an epoxy resin containing an aromatic group (e.g., a phenyl group) may be used. When the epoxy resin comprises an aromatic group, the cured product may have excellent thermal and chemical stability. A specific example of the aromatic group-containing epoxy resin that can be used in the present application may be one or a mixture of two or more of a biphenyl type epoxy resin, a dicyclopentadiene type epoxy resin, a naphthalene type epoxy resin, a dicyclopentadiene-modified phenol type epoxy resin, a cresol-based epoxy resin, a bisphenol-based epoxy resin, a xylylol-based epoxy resin, a polyfunctional epoxy resin, a phenol novolac epoxy resin, a triphenol methane type epoxy resin, and an alkyl-modified triphenol methane epoxy resin, and the like, but is not limited thereto.

In an embodiment of the present application, the thermosetting compound may comprise a curable monomer having a curable functional group in consideration of the fact that the composition is applied as an ink. The monomer may comprise two or more curable functional groups. The present application can improve the printing property of the ink composition, improve the curing speed, and realize an excellent curing hardness after curing, by comprising the monomer. In one example, the curable monomer may serve to prevent deformation of the pattern through temporary curing in a multi-profile curing method of two or more stages to be described below. The curable functional group may include an epoxy group, an acrylic group or a thiol group. As the monomer, for example, trimethylolpropane triglycidyl ether may be used, but the type thereof is not particularly limited. The monomer may be included in the composition in a range of 1 to 10 parts by weight relative to 100 parts by weight of the above-mentioned thermosetting resin.

Furthermore, as described above, the composition for 3D printing of the present application may comprise a thermoplastic resin. The thermoplastic resin may include, for example, an acrylic resin, a silicone resin, a fluororesin, a styrene resin, a polyolefin resin, a thermoplastic elastomer, a polyoxyalkylene resin, a polyester resin, a polyvinyl chloride resin, a polycarbonate resin, a polyphenylene sulfide resin, polyurethane, a cellulose resin, a melamine resin, a polyurethane resin, a polyacetal resin or a polyamide resin.

Here, as the styrene resin, styrene-ethylene-butadiene-styrene block copolymer (SEBS), styrene-isoprene-styrene block copolymer (SIS), acrylonitrile-butadiene-styrene block copolymer (ABS), acrylonitrile-styrene-acrylate block copolymer (ASA), styrene-butadiene-styrene block copolymer (SBS), styrene homopolymer or a mixture thereof can be exemplified. As the olefin resin, for example, a high-density polyethylene-based resin, a low-density polyethylene-based resin, a polypropylene-based resin, or a mixture thereof can be exemplified. As the thermoplastic elastomer, for example, an ester-based thermoplastic elastomer, an olefin-based thermoplastic elastomer or a mixture thereof and the like can be used. Particularly, as the olefin-based thermoplastic elastomer, a polybutadiene resin, a polyethylene resin or a polyisobutylene resin and the like can be used. As the polyoxyalkylene resin, for example, a polyoxymethylene resin, a polyoxyethylene resin or a mixture thereof can be exemplified. As the polyester resin, for example, a polyethylene terephthalate resin, a polybutylene terephthalate resin or a mixture thereof and the like can be exemplified. As the polyvinyl chloride resin, for example, polyvinylidene chloride and the like can be exemplified. In addition, a mixture of hydrocarbon resins can be included, and for example, hexatriacotane or paraffin and the like can be exemplified. As the polyamide resin, for example, nylon and the like can be exemplified. As the acrylate resin, for example, polybutyl (meth)acrylate and the like can be exemplified. As the silicone resin, for example, polydimethylsiloxane and the like can be exemplified. Furthermore, as the fluororesin, polytrifluoroethylene resin, polytetrafluoroethylene resin, polychlorotrifluoroethylene resin, polyhexafluoropropylene resin, polyfluorinated vinylidene, polyfluorinated vinyl, polyfluorinated ethylene propylene or a mixture thereof, and the like can be exemplified.

The above-listed resins may be also used, for example, by being grafted with maleic anhydride or the like, or by being copolymerized with the other resins as listed or monomers for producing resins, or by being modified with other compounds. An example of such other compounds may include carboxyl-terminal butadiene-acrylonitrile copolymer and the like.

In an embodiment of the present application, the thermoplastic resin may have a weight average molecular weight in a range of 8,000 to 1,000,000, 9,000 to 800,000, or 11,000 to 300,000. The term "weight average molecular weight" herein means a converted value for standard polystyrene, which is measured by GPC (Gel Permeation Chromatograph). By controlling the range of the weight average molecular weight of the thermoplastic resin, the present application may have effects of having appropriate physical properties in the 3D printing, allowing a precise three-dimensional shape to be formed, improving workability and suppressing deformation due to heat generated upon curing.

In one example, the thermoplastic resin may have a glass transition temperature before curing in a range of 40° C. to 150° C., 55° C. to 144° C., 64° C. to 138° C., or 72° C. to 123° C. By controlling the glass transition temperature range of the thermoplastic resin, the present application maintains the three-dimensional shape in a coating process or a magnetic field application process of the 3D printing process and allows a precise three-dimensional shape to be formed.

In the above, as described above, the composition for 3D printing may further comprise a thermosetting agent. For example, it may further comprise a curing agent capable of reacting with the thermosetting compound to form a cross-linked structure or the like.

A suitable type of the curing agent may be selected and used depending on the type of the functional group contained in the resin.

In one example, when the thermosetting compound is an epoxy resin, as the curing agent, a curing agent of the epoxy resin known in this field, for example, one or two or more of an amine curing agent, an imidazole curing agent, a phenol curing agent, a phosphorus curing agent, or an acid anhydride curing agent may be used, without being limited thereto.

In one example, as the curing agent, an imidazole compound which is solid at room temperature and has a melting point or a decomposition temperature of 80° C. or higher may be used. As this compound, 2-methylimidazole, 2-heptadecylimidazole, 2-phenylimidazole, 2-phenyl-4-methylimidazole or 1-cyanoethyl-2-phenylimidazole, and the like can be exemplified, but is not limited thereto.

The content of the curing agent may be selected depending on composition of the composition, for example, the kind and ratio of the thermosetting compound. For example, the curing agent may be included in an amount of 1 to 20 parts by weight, 1 to 10 parts by weight, or 1 to 8 parts by weight, relative to 100 parts by weight of the thermosetting compound. However, the weight ratio can be changed depending on the kind and ratio of the functional group of the thermosetting compound, the cross-linking density to be implemented, and the like.

In an embodiment of the present application, the 3D printing composition may further comprise a filler. The filler may be an organic filler, an inorganic filler, or a mixture thereof. The specific kind of the filler that can be used in the present application is not particularly limited and for example, one or a mixture of two or more of carbon black, carbon nanotubes, glass fiber, silica, synthetic rubber, $TiO_2$, organic/inorganic pigment, clay, or talc, and the like may be used. The filler may be included in an amount of 1 to 100 parts by weight, 10 to 80 parts by weight, or 20 to 60 parts by weight, relative to 100 parts by weight of the thermosetting compound. By using the filler, the present application can ensure the mechanical properties (rigidity, reinforcement) after the composition is cured, and improve dispersibility and bonding property between the nano-sized magnetic material and the organic material.

Furthermore, in one example, the 3D printing composition may further comprise a dispersing agent so that the magnetic particles can be uniformly dispersed. Here, as the usable dispersing agent, for example, a surfactant having an affinity with the surface of the magnetic particle and having good compatibility with the thermosetting compound, such as a nonionic surfactant, can be used. In addition, as the dispersing agent, a dispersing agent of a type containing an acidic or basic group, a high molecular weight acrylic polymer type having a weight average molecular weight of 10,000 or more, an inorganic soda type, or a metal salt type, and the like can be exemplified, and the composition of the present application may comprise one or more dispersing agents. The dispersing agent may be included in an amount of 0.01 to 10 parts by weight, 0.1 to 8 parts by weight, or 0.15 to 5 parts by weight, relative to 100 parts by weight of the thermosetting compound.

The composition for 3D printing according to the present application may comprise various additives depending on applications, the kind of the thermosetting compound, and the 3D printing process described below, in addition to the above-described constitutions, in the range without affecting the above-described effects of invention. For example, the composition may comprise a coupling agent, a cross-linking agent, a curable material, a tackifier, an ultraviolet stabilizer, or an antioxidant in an appropriate amount depending on the desired physical properties. Here, the curable material may mean a material having a thermosetting functional group and/or an active energy ray-curable functional group, which is separately included in addition to the components constituting the above-mentioned composition.

The present application also relates to a 3D printing method. An exemplary 3D printing method may comprise a step of sterically applying the above-described composition to form a three-dimensional shape. The 3D printing method according to the present application sterically applies the composition to form a three-dimensional shape, and then generates vibrational heat from the magnetic particles through a magnetic field application step, whereby the thermosetting compound can be uniformly cured.

In one example, the method comprises, prior to the step of applying the magnetic field, molding a mixture of a thermosetting compound and a thermoplastic resin by extrusion or injection at 30° C. to 100° C. as a temperature lower than the curing temperature of the thermosetting compound component, or forming a three-dimensional shape from the mixture through a nozzle. Thereafter, the method can improve deficient physical properties of the thermoplastic resin by cooling the mold or the three-dimensional shape and then curing the thermosetting compound using an alternate-current magnetic field generator. As the thermoplastic resin used herein, an amorphous vinyl chloride resin, polystyrene, an acrylonitrile-butadiene-styrene block copolymer (ABS) resin, and an acrylic resin.

In addition, the 3D printing method of the present application is not limited to the above method, and may comprise a method of directly heating a mixture of a thermosetting compound and a thermoplastic resin with an alternate-current magnetic field apparatus. At this time, the thermoplastic resin can serve as a filler that keeps the shape, and also serve to prevent deformation according to shrinkage by heat generated when a magnetic field is applied.

The step of applying a magnetic field is not particularly limited and can be performed with a known method by those skilled in the art. For example, the step of applying a magnetic field may be performed by applying a magnetic field with a current of 50 A to 500 A, 80 A to 450 A, or 120 A to 430 A at a frequency of 100 kHz to 1 GHz for 20 seconds to 60 minutes, 30 seconds to 30 minutes, or 30 seconds to 200 seconds.

In one example, the step of applying a magnetic field may comprise at least two steps of multi-profile methods. The multi-profile method may be performed at a frequency of 100 kHz to 1 GHz. Specifically, the multi-profile method may comprise a first step of applying a magnetic field with a current of 10 A to 80 A for 20 seconds to 10 minutes, a second step of applying a magnetic field with a current of 80 A to 130 A for 20 seconds to 10 minutes and/or a third step of applying a magnetic field with a current of 150 A to 500 A for 5 seconds to 5 minutes.

In addition, the step of applying a magnetic field may also proceed in a manner that gives a gradient difference of the profile. For example, in the case of the multi-profile method, it is a method of applying the magnetic field by controlling the intensity of the magnetic field stepwise, but the method of giving a gradient difference is a method of sequentially raising the magnetic field with 100 to 200 A at an interval, which can block rapid exotherm and prevent characteristic deterioration of the cured product to cause thermal degradation depending on characteristics of the resin to be cured upon rapidly applying heat.

On the other hand, the thermosetting can proceed with application of the magnetic field as described above, and may comprise additionally applying heat at 40° C. to 100° C. for 1 to 24 hours, after applying the magnetic field. Furthermore, without being limited to the above, it is possible to apply heat together with applying the magnetic field.

The present application also relates to a three-dimensional solid shape. The three-dimensional shape may comprise a cured product of the above-described composition for 3D printing.

The present application also relates to a microelectronic device. An exemplary microelectronic device may comprise a cured product containing the above-described composition. The cured product may be applied as a sealing material, but is not limited thereto. For example, the microelectronic device may include a micro battery, a biosensor, an actuator, or the like. In addition, the present application can provide a display device using the above-described composition as a sealing material or the like.

The present application also relates to a mold. The mold may comprise the above-described composition for 3D printing. The mold may be formed from the composition for 3D printing through the above-described 3D printing method. The mold may be in the form of a curved surface, but is not limited thereto, and may be a planar form or a form in which a curved surface and a planar surface coexist.

Advantageous Effects

The present application provides a composition for 3D printing capable of realizing a three-dimensional solid shape having precision and excellent curing stability.

BRIEF DESCRIPTION OF DRAWING

FIG. 1 is a view showing evaluation of lamination printability of the compositions for 3D printing prepared in Examples and Comparative Examples of the present invention.

BEST MODE

Hereinafter, the present invention will be described in more detail with reference to Example complying with the present invention and Comparative Examples not complying with the present invention, but the scope of the present invention is not limited by the following examples.

Example 1

As a thermosetting compound, an epoxy resin (YD-128 from Kukdo Chemical Co., Ltd.) and trimethylolpropanetriglycidyl ether were introduced to a mixing vessel at a weight ratio of 95:5, respectively. 5 parts by weight of $FeOFe_2O_3$ particles (Multi-Magnetic Domains, coercive force 94 kOe, saturation magnetization value 80 emu/g, particle size about 100 nm: measured by Field Emission Scanning Electron Microscope (using DLS)), which are a soft magnetic material (Soft Type), as magnetic particles, 5 parts by weight of an acrylic resin (B60 from DOW Plaroid) as a thermoplastic resin and 0.5 parts by weight of an SI-B2A curing agent from Sam Shin Chemical Co., Ltd. as a thermosetting agent, relative to 100 parts by weight of the thermosetting compound, were introduced to the mixing vessel to prepare a composition for 3D printing.

Immediately after laminating the 3D printing composition on a support through a nozzle in a feeding device, a magnetic field was applied thereto at a current value of 100 A and a condition of 385 kHz for 1 minute in an external alternate-current magnetic field generator. The magnetic field was applied by introducing the composition into a sample vial (0.4 mL container) in a solenoid coil (3 turns, OD 50 mm, ID 35 mm) and adjusting the current value and time of the magnetic field generator (Easyheat 820 from Ambrell). The composition was thermally cured with vibrational heat generated through application of the magnetic field to form a pattern or a three-dimensional shape.

Example 2

A composition for 3D printing was prepared in the same manner as in Example 1, except that an acrylic resin, A14 from DOW Plaroid Co., was used as a thermoplastic resin, and allowed to form a three-dimensional shape.

Example 3

A composition for 3D printing was prepared in the same manner as in Example 1, except that high-density polyethylene (HDPE) from LG Chem was used as a thermoplastic resin, and allowed to form a three-dimensional shape.

Example 4

A composition for 3D printing was prepared in the same manner as in Example 1, except that a melamine resin (Dong Kwang, DM-30) was used as a thermoplastic resin, and allowed to form a three-dimensional shape.

Example 5

A composition for 3D printing was prepared in the same manner as in Example 1, except that a polyurethane resin (Kukdo Chemical Co., Ltd., KPU-100) was used as a thermoplastic resin, and allowed to form a three-dimensional shape.

Example 6

A composition for 3D printing was prepared in the same manner as in Example 1, except that an acrylonitrile-butadiene-styrene resin (ABS, LG Chem) was used as a thermoplastic resin, and allowed to form a three-dimensional shape.

Example 7

A composition for 3D printing was prepared in the same manner as in Example 1, except that a polystyrene resin (Sigma Aldrich, Mw 13,000) was used as a thermoplastic resin, and allowed to form a three-dimensional shape.

Comparative Example 1

A composition for 3D printing was prepared in the same manner as in Example 1, except for using no thermoplastic resin, and allowed to form a three-dimensional shape.

Physical properties of the compositions and the three-dimensional shapes in Examples and Comparative Examples were evaluated in the following manner.

1. Surface Energy Measurement Before Curing

The surface energy of the compositions for 3D printing prepared in Examples and Comparative Examples before curing was measured with Wilhelmy plate method using a Tensiometer K10ST from Kruss. When a perpendicular plate made of platinum with a known perimeter was attached to a balance and the perpendicular plate came down to a film forming composition, the force due to wetting was measured using a digital tensiometer. That is, the surface energy is measured by the force due to wetting formed between two interfaces that a container for holding the ink composition is in the bottom and the loop-type platinum perpendicular plate is slowly lowered horizontally from the top.

2. Surface Energy Measurement After Curing

The surface energy of the compositions for 3D printing prepared in Examples and Comparative Examples was measured using a drop shape analyzer (DSA100 product from KRUSS). The composition for 3D printing is applied on a SiNx substrate with a thickness of about 50 μm and a coating area of 4 $cm^2$ (width: 2 cm, length: 2 cm) (spin coater) and cured by applying a magnetic field in a manner aforementioned in Examples and Comparative Examples. After curing, a procedure, in which deionized water having a known surface tension is dropped on the film to obtain the contact angle, is repeated 5 times to calculate an average value of the obtained five contact angle values, and equally, a procedure, in which diiodomethane having a known surface tension is dropped to obtain the contact angle, is repeated 5 times to calculate an average value of the obtained five contact angle values. Then, the surface energy was calculated by substituting values (Strom values) related to surface tension of solvents by the Owens-Wendt-Rabel-Kaelble method using the calculated average values of contact angles for deionized water and diiodomethane.

3. Evaluation of Lamination Printability

As shown in FIG. 1, the compositions for 3D printing prepared in Examples and Comparative Examples were laminated to a primary pattern with a size of width a1, length b1 and height c1 and cured by applying a magnetic field thereto at a current value of 100 A and a condition of 385 kHz for 1 minute in an external alternate-current magnetic field generator. In the same manner, the compositions were laminated to a secondary pattern with a size of width a2, length b2 and height c2 and cured, and in the same manner, the compositions were laminated to a tertiary pattern with a size of width a3, length b3 and height c3 and cured.

In the above, b was laminated to a width of 1000 μm and c was laminated to a height of 400 μm, and deviation values of b and c in the lamination were calculated.

1) Deviation values of b and c were classified as excellent when both are 20 μm or less, good when at least one is 20 μm or less, and need improvement when both are more than 20 μm.

2) Deviation values of b/deviation values of c were calculated. The value obtained by dividing the deviation value of b by the deviation value of c can be determined as perfect when it is 0 to 1, excellent when it is more than 1 and 2.0 or less, good when it is more than 2.0 and 2.6 or less, need improvement when it is more than 2.6 and 3.0 or less, and poor when it is more than 3.0.

When at least one evaluation in the evaluation of 1) and 2) above became good or more, it was classified as suitable printability.

TABLE 1

|  | Surface energy before curing (mN/m) | Surface energy after curing (mN/m) | Lamination printability (deviation value of b and deviation value of c) |
| --- | --- | --- | --- |
| Example 1 | 35.4 | 37.6 | 7 μm, 4 μm |
| Example 2 | 33.8 | 36.4 | 6 μm, 3 μm |
| Example 3 | 24.1 | 28.7 | 18 μm, 12 μm |
| Example 4 | 42.9 | 49.1 | 220 μm, 85 μm |
| Example 5 | 32.1 | 35.4 | 4 μm, 2 μm |
| Example 6 | 30.3 | 32.7 | 9 μm, 5 μm |
| Example 7 | 27.4 | 29.5 | 15 μm, 8 μm |
| Comparative Example 1 | 39.6 | 44.6 | 200 μm, 70 μm |

The invention claimed is:

1. A composition for 3D printing comprising a thermosetting compound, 2 to 28 parts by weight of a thermoplastic resin, relative to 100 parts by weight of said thermosetting compound, and magnetic particles,
   wherein the magnetic particles have at least two magnetic domains, wherein the magnetic domains are irregularly arranged when an external magnetic field is absent, and are magnetized by an external alternate-current magnetic field,
   wherein the magnetic domains have an average size in a range of 10 to 50 nm, and
   wherein the thermosetting compound comprises at least one thermosetting functional group,
   wherein the composition for 3D printing has a surface energy before curing in a range of 20 mN/m to 50 mN/m,
   wherein the composition for 3D printing has a surface energy after curing in a range of 20 mN/m to 55 mN/m.

2. The composition for 3D printing according to claim 1, wherein the magnetic particles have a coercive force in a range of 1 to 200 kOe.

3. The composition for 3D printing according to claim 1, wherein the magnetic particles have a saturation magnetization value at 25° C. in a range of 20 to 150 emu/g.

4. The composition for 3D printing according to claim 1, wherein the magnetic particles have an average particle size in a range of 20 to 300 nm.

5. The composition for 3D printing according to claim 1, wherein the magnetic particles comprise metal oxide, ferrite or alloy particles.

6. The composition for 3D printing according to claim 1, wherein the magnetic particles are comprised in an amount of 0.01 to 25 parts by weight, relative to 100 parts by weight of the thermosetting compound.

7. The composition for 3D printing according to claim 1, wherein the magnetic particles are vibrated by magnetization reversal.

8. The composition for 3D printing according to claim 1, wherein the thermoplastic resin comprises an acrylic resin, a silicone resin, a fluororesin, a styrene resin, a polyolefin resin, a thermoplastic elastomer, a polyoxyalkylene resin, a polyester resin, a polyvinyl chloride resin, a polycarbonate resin, a polyphenylene sulfide resin, polyurethane, a cellulose resin, a polyacetal resin, a melamine resin, a polyurethane resin or a polyamide resin.

9. The composition for 3D printing according to claim 1, wherein the thermoplastic resin has a glass transition temperature before curing in a range of 40° C. to 150° C.

10. The composition for 3D printing according to claim 1, further comprising a thermosetting agent.

11. A 3D printing method comprising a step of applying the composition for 3D printing of claim 1 to form a three-dimensional shape.

12. The 3D printing method according to claim 11, further comprising a step of applying a magnetic field to the applied composition.

13. The 3D printing method according to claim 12, wherein the step of applying a magnetic field applies a magnetic field with a current of 50 A to 500 A at a frequency of 100 kHz to 1 GHz for 20 seconds to 60 minutes.

14. The 3D printing method according to claim 12, wherein the step of applying a magnetic field comprises at least two steps of multi-profile methods.

15. A three-dimensional shape comprising a cured product of the composition for 3D printing of claim 1.

* * * * *